United States Patent [19]

Delhaye et al.

[11] 4,004,034
[45] Jan. 18, 1977

[54] PROCESS FOR THE MANUFACTURE OF WORTS

[75] Inventors: Alain Delhaye, Marquette Lez Lille; Manfred M. Moll, Champigneulles, both of France; James R. Pollock, Reading, England

[73] Assignees: Grandes Malteries Modernes, Marquette Lez Lille; Groupement D'Interet Economique Tepral, Champigneulles, both of France; Pollock International Limited, Hamilton, Bermuda

[22] Filed: Oct. 29, 1974

[21] Appl. No.: 519,010

Related U.S. Application Data

[63] Continuation of Ser. No. 273,962, July 21, 1972, abandoned.

[30] Foreign Application Priority Data

July 26, 1971 France .............................. 71.27330

[52] U.S. Cl. .................................................. 426/29
[51] Int. Cl.$^2$ .......................................... C12C 7/00
[58] Field of Search ........... 426/28, 29, 30; 195/17, 195/64, 61, 70, 71, 128, 129

[56] References Cited

UNITED STATES PATENTS

| 2,947,667 | 8/1960 | Komm .................................. 426/29 |
| 3,081,172 | 3/1963 | Dennis et al. ......................... 195/17 |

OTHER PUBLICATIONS

Linko et al., "Use of Unmalted Barley in Brewing," Institute of Brewing Journal, vol. 72, 1966, p. 311.
Narziss et al., "Use of Green Malt in Brewing," Institute of Brewing Journal, vol. 74, 1968, p. 387.

*Primary Examiner*—R. B. Penland
*Attorney, Agent, or Firm*—Larson, Taylor and Hinds

[57] ABSTRACT

Wort suitable for making e.g. beer is produced by extracting ground chit malt with a mixture of hot water and malt, the proportion of malt being 10 to 40% by weight on a solids basis of the dry weight of the mixture of ground chit malt and malt.

9 Claims, No Drawings

PROCESS FOR THE MANUFACTURE OF WORTS

This is a continuation of application Ser. No. 273,962 filed July 21, 1972 (now abandoned).

The present invention relates to the manufacture of wort.

It is known to manufacture wort especially that used in the manufacture of undistilled, fermented liquor such as beer, by subjecting barley to a process comprising the so-called malting stage, during which malt is formed which contains the primary enzymatic agent necessary for the production of the wort. This malting operation is expensive.

It has thus been proposed to replace the malting of the barley by adding amylolytic and proteolytic enzymes to a mass of crude cereals, for example to unmalted barley. In this way, it is possible to lower the cost of the wort.

However, this lowering of the cost of the wort is insufficient, especially because of the cost of the proteolytic enzymes, and, furthermore, the wort produced from barley treated in this way has an insufficient content of certain aminoacids, especially histidine, serine, valine, isoleucine and phenylalanine, which are necessary for the development of the yeast during the subsequent treatment of the wort.

The aim of this invention is to overcome these disadvantages and to provide a process for the manufacture of wort, which is cheap to carry out and which leads to worts, the composition of which satisfies the practical requirements.

The process of the invention comprises subjecting barley to at least one treatment cycle comprising a steeping in water followed by exposure to air, the conditions of temperature and of duration of the stages of this cycle being chosen so as to cause chitting of the barley, that is to say the formation of chit malt, this treatment being carried out under conditions to assist the development of a maximum enzymatic potential, grinding the chit malt, extracting it with a mixture of hot water and malt, the proportion of malt being 10 to 40% by weight on a solids basis of the dry weight of the mixture of ground chit malt and malt, and optionally also an enzymatic agent, especially an amylase protease and/or $\beta$-glucanase, and then separating the wort so produced. This wort can then be used in conventional manner, e.g. for brewing beer.

The barley is first steeped by immersing it, for from 1 to 12 hours, in water at a temperature below about 45° C, that is to say below a temperature at which the grains of barley could be damaged. In general, this temperature is between 20° and 30° C; furthermore, the duration of the steeping, which is a function of the capacity of the barley to absorb water, is generally 1 to 6 hours. The immersion can be replaced by a spraying with water.

The barley is then separated from the steeping water, which is removed with the dissolved materials which it contains, and exposed to air inside a chamber in which the temperature is kept at between about 10° and about 40° C. A temperature much below 10° C, would, in effect, markedly slow down the process, and a temperature much above 40° C, would denature the barley proteins. The duration of this exposure must be sufficient to cause the barley to germinate, that is to say to cause the appearance of the white tip of the shoot emerging from the husk of the grain. Experience shows that the minimum duration necessary for the appearance of this shoot is about 5 hours, and it has also been found that this shooting always occurs in less than 24 hours. At all events, this treatment, which results in the chitting of the barley, is generally stopped before clearly distinguished rootlets appear.

The chit malt is ground with a mill to reduce it to particles, the diameter of which is sufficiently small to make a good subsequent extraction possible. It is then extracted with a mixture of hot water, 10 to 40% (expressed as dry weight) of malt (this quantity of malt being expressed in relation to the dry weight of the mixture of chit malt and malt), and optionally, an enzymatic agent, especially an amylase protease and/or $\beta$-glucanase.

Once the malt and the enzyme or enzymes (if any) have acted on the chit malt, the liquid phase, which forms the wort, is separated from the insoluble parts forming the draff.

It can be advantageous, for ease of working to store the chit malt, which is obtained at the end of the abovementioned steeping followed by exposure to air. For this storage, it is convenient to subject the chit malt to a treatment to stop the development of the biological processes occurring in it, whilst retaining its enzymatic potential. Such a treatment can consist of storing it at a low temperature, of the order of 0° C, or of drying it, for example with air so that the temperature of the grain does not exceed about 45° C. Other types of treatment, for example freeze-drying, can be used. When a dehydration is used, it is continued until the water content of the grain is less than 25%, and preferably less than 15%.

The chit malt, thus treated, can either be stored as it is or it can be stored after having been mixed with enzymatic agents and/or malt, the use of which is provided for in the rest of the treatment.

The chit malt may advantageously be rolled (i.e. the grain is flattened, possibly with an alteration in its internal structure). If this rolling is carried out before the abovementioned dehydration treatment, this dehydration treatment, as well as the subsequent mixing and grinding operations, are facilitated. If it is carried out after the dehydration, only the subsequent mixings and grinding are facilitated.

The rest of the operations for producing the chit malt, and the subsequent treatments to which the latter is subjected, are carried out under conditions to assist the appearance and retention of a maximum enzymatic potential. To achieve these conditions, it is essential to take care that the grain has sufficient oxygen and is not "asphyxiated", for example by an accumulation of $CO_2$; it is also necessary to prevent any deterioration caused by abnormal heating. A continuous or discontinuous check is therefore kept, by methods which are in themselves known, on the content of oxygen available for the grain and on its temperature; it is possible to increase the oxygen content and remove $CO_2$, for example by blowing methods or by trickling methods.

The wort obtained at the end of the abovementioned treatments is then subjected to known treatments in the manufacture of beer or in other foodstuff industries envisaged.

The enzymatic agent, which may be used in the process just described, may comprise at least one amylolytic enzyme, for example $\alpha$-amylase, and/or one proteolytic enzyme. The enzymatic mixture advantageously has an activity of the amyloglucosidase type, the β-amylase type, the pullulanase type and other types.

The exact choice of conditions for carrying out the process within the ranges indicated above depends on the variety of barley which is treated.

Instead of grinding the chit malt and of then extracting it thereafter with the abovementioned mixture of water and malt, it is also possible to mix the chit malt with the malt, to grind this mixture and to extract it with the water and the optional enzymatic agent.

It can be advantageous to carry out, after the exposure to air of the steeped barley, a second stage of steeping at a temperature below about 45° C, but which is shorter and between 30 minutes and 6 hours, this second steeping being followed by a second exposure to air at a temperature of 10° to 40° C. for 1 to 20 hours. Here again, the exact conditions depend on the variety of barley treated.

Instead of two cycles each comprising a stage of steeping and a stage of exposure to air, it is possible to have three or more of these cycles. Following this procedure, it is generally possible to choose the working conditions such that the entire duration of all these cycles is less than 36 hours.

To improve the yield of the process of the invention, it can be advantageous to remove the husk of the barley, at least partially, before subjecting it to the various stages of the treatment.

Furthermore, in order to accelerate the germination and to improve the qualities of the wort, it can be valuable to add to the barley, at or after the first stage of steeping, an amount of giberellic acid sufficent to give a concentration of this acid which can be as much as five parts per million (based on the dry weight of the grain).

To accelerate the start of the germination, substances such as hydrogen peroxide, $H_2O_2$, can be added to the steeping water. Furthermore, the addition of lime makes it possible to dissolve certain undesirable constituents of the husk of the grain, such as resins, tannins and others.

By the process of the invention, not only is the cost of manufacturing the wort reduced, but the depletion of these worts in certain aminoacids, which has been encountered in the enzymatic processes previously proposed, is also avoided.

To demonstrate this advantage of the process of the invention, the Table 1 below gives the aminoacid content of worts prepared in one case from crude barley converted by a mixture of malt and enzymes, and in the other case from germinated barley converted by the mixture of malt and enzymes. The Table gives the percentage of each aminoacid relative to the corresponding aminoacid content obtained in conventional processes in which only normal malt is used in making the wort.

TABLE I

| Aminoacids | Wort obtained by treatment of crude barley % | Wort obtained by treatment of germinated barley % |
| --- | --- | --- |
| Histidine | 56.9 | 83.6 |
| Serine | 77.7 | 96.5 |
| Valine | 71.2 | 85.2 |
| Isoleucine | 70.4 | 86.4 |

TABLE I-continued

| Aminoacids | Wort obtained by treatment of crude barley % | Wort obtained by treatment of germinated barley % |
| --- | --- | --- |
| Phenylalanine | 71.9 | 76.7 |

The following Examples illustrate the invention.

EXAMPLE 1

A sample of barley is steeped in water at 25° C. for 1½ hours. At the end of this steeping, the grains are separated from the water and exposed for 5 hours to air at 25° C. The grains are then steeped again for 1 hour in water at 25° C, and again exposed to air at 25° C, for 16½ hours. After this second exposure, more than 90% of the grains of barley have germinated. The chit malt thus obtained is ground and then extracted with 20% (dry weight) of malt (based on the dry weight of barley and malt) and 0.08% of an aqueous solution of α-amylase, for example that known by the trade name "RAPIDASE SP 250 M" (this amount being based on the dry weight of the grain). The temperature of the extraction is kept at 42.5° C, for 45 minutes, after which it is raised to 65° C, at the rate of 1° C. per minute, and then held at 65° C. for 1 hour.

In a second experiment, the extraction is carried out at an initial temperature of 50° C.

In a third experiment, the extraction is carried out at an initial temperature of 47.5° C. and the same enzymatic agents are used as in the preceding experiments, but the brewing pH is corrected so as to bring it back to 5.4.

In a fourth experiment, the extraction is carried out under the same conditions as in the third experiment, but a preparation of amyloglucosidase, in the proportion of 0.08% of the dry weight of grain used, is employed as enzymatic agent.

In parallel with the treatments which have just been described, two control experiments are carried out by subjecting two equivalent amounts of crude barley to the same treatments as the first two which have just been described.

The worts obtained in each of the cases are analysed by the processes defined within the "EUROPEAN BREWERY CONVENTION" published in ANALYTICA EBC.

The results obtained are given in Table II below, in which the analyses of the total soluble nitrogen are based on the dry weight of the barley.

TABLE II

| Initial brewing temperature | Crude barley | | Malt posessing shoots | |
| --- | --- | --- | --- | --- |
| | Total soluble nitrogen in the worts (%) | Solids content % | Total soluble nitrogen in the worts (%) | Solids content % |
| 42.5° C. | 0.404 | 76.3 | 0.519 | 75.8 |
| 50.0° C. | 0.456 | 76.3 | 0.528 | 75.9 |
| 47.5° C. | | | 0.552 | 80.2 |
| 47.5° C. | | | 0.609 | 82.1 |

Solids content = dry material contained in the wort

On examining this Table, it is found that the process of the invention makes it possible to achieve proportions of total soluble nitrogen in the worts obtained using chit malt which are greater by at least 20% than those obtained using crude barley, which is very advantageous for the subsequent stages in which yeast plays a part.

Furthermore, this Table shows that the choice of an appropriate enzymatic complex contributes towards markedly improving the solids content obtained.

It is found that a very marked improvement in the speed of filtering the worts prepared from the chit malt was also obtained by the process of the invention.

EXAMPLE 2

To illustrate the possibilities of the choice of conditions for carrying out the first and second cycles of steeping and exposure to air, the numerical information relating to these conditions is given in Table III below, for three samples of barley.

TABLE III

| Sample No. | First steeping conditions | Exposure to air | Second steeping conditions | Exposure to air |
|---|---|---|---|---|
| 1 | 1 hr. at 30° C. | 5 hrs. at 30° C. | 1 hr. at 30° C. | 17 hrs. at 30° C. |
| 2 | 4 hrs. at 20° C. | 8 hrs. at 20° C. | 4 hrs. at 20° C. | 12 hrs. at 20° C. |
| 3 | 6 hrs. at 20° C. | 18 hrs. at 20° C. | | |

The samples of chit malt thus obtained are treated as in Example 1, from the grinding stage onwards.

EXAMPLE 3

Some barley is treated by a mechanical process to remove a part of its husks (for example 5 to 6% of the total dry weight of the barley). The barley is then immersed in water for 1 hour 30 mins. at 25° C. The water is poured off and the barley is left uncovered for 6 hours, aerating it continuously or intermittently to retain a temperature of 25° C. in the mass of grains. At the end of this period, the moisture content of the grain is about 30%.

The grain is then immersed for a second time, for 1 hour, in water to which 0.5% of hydrogen peroxide has previously been added, and the water is then poured off and the grain is left uncovered again for 15 hours 30 minutes, aerating it continuously to retain a temperature of 25° C.

The chit malt thus obtained is then rolled by passing it between two rollers, so as to alter its shape slightly and to alter its internal structure. The grain is then moistened with a solution containing amylolytic and/or proteolytic and/or α-glycanasic enzymes.

After this addition, the grain is dried by a stream of hot air, the temperature in the grain remaining below 40° C; this drying is stopped, for example, when the moisture content reaches 12%. The chit malt thus treated can be transported in sacks or loosely, like ordinary malt, and can be stored for 2 weeks or more before being used.

Before use, the stored chit malt is ground in a mill, for example a roll mill of the conventional type used in brewing. The malt which, in the rest of the treatment, is mixed with the chit malt, for example in a proportion of 20%, can be mixed with the chit malt before the grinding, or it can be ground separately and then mixed.

This mixture or the various constituents are used to manufacture a wort intended to be fermented for the purpose of producing beer. For example, a conventional brewing method can be used.

For example, the mash may be made from:
30% of maize in the form of "grits" (maize semolina), or maize starch, or glucose syrup;
20% of malt which has been well broken up and which has a high enzymatic potential; and
50% of chit malt, treated as described above.

The maize is made into a paste ("doughed in") separately and it can be worked, by a conventional brewing process, with part of the malt or with an enzyme which has a high α-amylase activity.

The "mash" (malt + chit malt) is made into a paste at 52° C, and this temperature is maintained for 45 minutes. The soaked maize is then combined with the "mash" and the brewing is continued in a conventional brewing manner.

The enzymatic agent added while the "mash" is made into a paste is, for example, a preparation of amyloglucosidase, used in a proportion of 0.05 to 0.08% (based on the dry weight of the mash).

The characteristics of the wort are given in the Table below.

| Solids content in % | Analysis of the wort (13 degrees Pluto) | | | |
|---|---|---|---|---|
| | Soluble nitrogen in mg/l | α-Amine nitrogen in mg/l | Apparent attenuation in % | pH |
| 83.9 | 960 | 238 | 80.1 | 5.4 |

These values show that the wort has characteristics which are very similar to those obtained in conventional brewing. Furthermore, it is interesting to note that the quality of a beer produced by fermentation of this wort is not different from that of a beer manufactured in a conventional manner.

We claim:

1. A process for the manufacture of a wort which comprises subjecting barley to at least one treatment cycle comprising a steeping in water followed by exposure to air, the conditions of temperature and the duration of the stages of this cycle being chosen to cause chitting of the barley to form chit malt and to promote the development of a maximum enzymatic potential, rolling the chit malt, drying the rolled chit malt to stop the development of the biological processes occuring in it while retaining its enzymatic potential, grinding the dried and rolled chit malt and extracting it with a mixture of hot water and malt, the quantity of malt being 10 to 40% by weight on a solids basis of the dry weight of the mixture of ground chit and malt, and separating the wort so produced.

2. Process according to claim 1 in which the barley is steeped for 1 to 12 hours in water at a temperature below 45° C, separated from the steeping water, and exposed to air at 10° to 40° for 5 to 24 hours, to cause the barley to chit.

3. Process according to claim 2 in which, after the first exposure to air, the barley is steeped again at a temperature below 45° C for 30 minutes to 6 hours, this second stage of steeping being followed by a second exposure to air at 10° to 40° C for 1 to 20 hours.

4. Process according to claim 1, in which the extraction of the chit malt is carried out in the presence of an enzymatic agent having amylolytic, proteolytic and/or a β-glycanasic activity.

5. Process according to claim 4, in which the enzymatic agent has an activity of the amyloglucosidase, β-amylase and/or pullulanase type.

6. Process according to claim 1, in which the barley used is first freed, at least partially, of its husks.

7. Process according to claim 1 in which giberellic acid is added to the barley at the earliest during the first stage of steeping.

8. Process according to claim 7, in which the amount of giberellic acid added is at most equal to 5 parts per million by weight of the barley (dry weight).

9. A process for the preparation of chit malt capable of being stored which comprises subjecting barley to at least one treatment cycle comprising a steeping in water followed by exposure to air, the conditions of temperature and of duration of the stages of this cycle being chosen to cause chitting of the barley to form chit malt, rolling the chit malt and drying the rolled chit malt to stop the development of the biological processes occuring in it while retaining its enzymatic potential.

* * * * *